United States Patent
Kim et al.

(10) Patent No.: US 9,421,968 B2
(45) Date of Patent: Aug. 23, 2016

(54) SYSTEM AND METHOD FOR CONTROLLING TORQUE FOR HYBRID VEHICLE

(71) Applicants: Hyundai Motor Company, Seoul (KR); Kia Motors Corporation, Seoul (KR)

(72) Inventors: Sang Joon Kim, Seoul (KR); Jee Wook Huh, Bucheon-si (KR); Teh Hwan Cho, Anseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 16 days.

(21) Appl. No.: 14/473,562

(22) Filed: Aug. 29, 2014

(65) Prior Publication Data
US 2015/0166044 A1    Jun. 18, 2015

(30) Foreign Application Priority Data
Dec. 18, 2013    (KR) ................. 10-2013-0158002

(51) Int. Cl.
*B60K 6/48* (2007.10)
*B60K 6/26* (2007.10)
*B60W 10/06* (2006.01)
(Continued)

(52) U.S. Cl.
CPC ............ *B60W 20/10* (2013.01); *B60K 6/48* (2013.01); *B60W 10/02* (2013.01); *B60W 10/06* (2013.01); *B60W 10/08* (2013.01); *B60W 10/184* (2013.01); *B60W 30/18172* (2013.01);
(Continued)

(58) Field of Classification Search
CPC .. B60W 10/06; B60W 10/08; B60W 40/105; B60K 6/365; B60K 6/48; B60K 6/26; B60K 6/442; B60K 6/445; F01L 1/053; B60T 13/586

USPC ....... 701/22, 70; 903/930; 180/65.2, 65.265, 180/65.25, 65.225, 197; 303/3; 123/90.16; 477/21
See application file for complete search history.

(56) References Cited

U.S. PATENT DOCUMENTS

2003/0006076 A1* 1/2003 Tamor ................. B60W 10/06
                                                           180/65.25
2005/0133286 A1* 6/2005 Oshidari ................ B60K 6/26
                                                           180/65.225
(Continued)

FOREIGN PATENT DOCUMENTS

JP    2008-068704 A    3/2008
JP    2013-063722 A    4/2013
(Continued)

*Primary Examiner* — Yuri Kan
(74) *Attorney, Agent, or Firm* — McDermott Will & Emery LLP

(57) ABSTRACT

A system for controlling torque for a hybrid vehicle includes a power source having an engine and a motor. An engine clutch is provided between the engine and the motor. A driving information detector detects demand torque for driving. A traction controller controls oil pressure supplied into a brake to prevent a wheel slip and request torque reduction control from a vehicle controller when the wheel slip is detected. A vehicle controller controls engagement of the engine clutch for driving in a hybrid electric vehicle (HEV) mode, wherein the vehicle controller determines output torques of the engine and the motor to perform torque reduction control according to the torque reduction control, and when the request for the torque reduction control is released, the vehicle controller sets a gradient for torque restoration of the engine and the motor and applies the gradient to follow the demand torque for driving.

3 Claims, 3 Drawing Sheets

(51) Int. Cl.
*B60W 20/00* (2016.01)
*B60W 10/08* (2006.01)
*B60W 10/02* (2006.01)
*B60W 10/184* (2012.01)
*B60W 30/18* (2012.01)

(52) U.S. Cl.
CPC ........ *Y02T 10/6221* (2013.01); *Y02T 10/6286* (2013.01); *Y10S 903/93* (2013.01)

(56) References Cited

U.S. PATENT DOCUMENTS

| | | | | |
|---|---|---|---|---|
| 2006/0272869 A1* | 12/2006 | Hidaka | ............. | B60K 6/48 180/65.25 |
| 2009/0255746 A1* | 10/2009 | Boesch | ............. | B60K 6/365 180/197 |
| 2011/0162602 A1* | 7/2011 | Smith | ............. | F01L 1/053 123/90.16 |
| 2012/0100958 A1* | 4/2012 | Oue | ............. | B60W 10/08 477/21 |
| 2013/0060409 A1* | 3/2013 | Matsushita | ............. | B60K 6/442 701/22 |
| 2013/0076113 A1* | 3/2013 | Pihl | ............. | B60T 13/586 303/3 |
| 2015/0057862 A1* | 2/2015 | Sato | ............. | B60K 6/445 701/22 |
| 2015/0127237 A1* | 5/2015 | Blyth | ............. | B60W 40/105 701/70 |

FOREIGN PATENT DOCUMENTS

| | | |
|---|---|---|
| KR | 10-2010-0056942 A | 5/2010 |
| KR | 10-0992721 B1 | 11/2010 |
| KR | 10-2012-0122599 A | 11/2012 |

* cited by examiner

SYSTEM AND METHOD FOR CONTROLLING TORQUE FOR HYBRID VEHICLE

CROSS-REFERENCE TO RELATED APPLICATION

This application claims the benefit of priority to Korean Patent Application No. 10-2013-0158002 filed in the Korean Intellectual Property Office on Dec. 18, 2013, the entire contents of which are incorporated herein by reference.

TECHNICAL FIELD

The present disclosure relates to a hybrid vehicle. More particularly, the present disclosure relates to a system and method for controlling torque for a hybrid vehicle that may maintain continuity of torque without generating a torque step by controlling an engine and a motor with a constant gradient for a torque restoration when a torque reduction control by a traction control system (TCS) is released.

BACKGROUND

According to a continuous demand for improvement in vehicle fuel efficiency and regulations regarding discharge of exhaust in each country, a demand for an environmentally-friendly vehicle has been increased, and a hybrid vehicle and a fuel cell vehicle have become alternatives for the demand. Although the hybrid vehicle may be different from the fuel cell vehicle and an electric vehicle, here, the hybrid vehicle is defined as a vehicle provided with one or more batteries for using energy stored therein as driving power of the vehicle, including a general electric vehicle and the fuel cell vehicle.

The hybrid vehicle has an engine and a motor as power sources. Optimal output torque of the hybrid vehicle depends on how to combine and operate the engine and the motor according to a running state. The hybrid vehicle may be a transmission mounted electric device (TMED) type of hybrid vehicle or a flywheel mounted electric device (FMED) type of hybrid vehicle.

When the hybrid vehicle runs, a traction control system (TCS) sends a request for torque reduction control to a vehicle controller connected by a network to reduce torques of the engine and the motor when a wheel slip occurs at a driving wheel. In response to the request from the TCS, the vehicle controller compares a current output torque with a torque requested from the TCS to determine execution conditions of torque reduction control and sets a torque reduction value. The vehicle controller then reduces the output torques of the engine and the motor to prevent wheel slip from occurring for stable operation.

When the wheel slip does not occur according to the torque reduction control by the vehicle controller, the TCS sends a request for release of the torque reduction control to the vehicle controller. In response to the release request from the TCS, the vehicle controller restores the output torques of the engine and the motor to demand torque for driving.

When a torque reduction control of a TCS is released in a vehicle including one power source, since output torque of the one power source may be smoothly changed, an abrupt change of the output torque may be prevented. However, when two power sources are restored in driving demand torque in the hybrid vehicle in which two or more power sources, for example, the engine and the motor, are operated, since a step-like difference in torque commands and response performance may occur between the two power sources, launching linearity may deteriorate and an abrupt impact may occur.

In addition, when the torque reduction control of the TCS is released in the vehicle including the two or more power sources and output torque of a last operated power source is abruptly changed, even though a total sum of driving demand torque is the same, actual output torques may be different according to each dynamic characteristic of the power sources, thus drivability may deteriorate.

The above information disclosed in this Background section is only for enhancement of understanding of the background of the disclosure and therefore it may contain information that does not form the prior art that is already known in this country to a person of ordinary skill in the art.

SUMMARY

The present disclosure provides a system and method for controlling torque for a hybrid vehicle having advantages of maintaining continuity of torque without generating a torque step by controlling an engine and a motor with a constant gradient for torque restoration when torque reduction control by a traction control system (TCS) is released.

According to an exemplary embodiment of the present disclosure, a system for controlling torque for a hybrid vehicle includes a power source that includes an engine and a motor. An engine clutch is provided between the engine and the motor. A driving information detector is configured to detect demand torque for driving. A traction controller is configured to control oil pressure supplied into a brake to prevent a wheel slip and configured to request torque reduction control from a vehicle controller when the wheel slip is detected. A vehicle controller is configured to control engagement of the engine clutch for driving in a hybrid electric vehicle (HEV) mode, wherein the vehicle controller determines output torques of the engine and the motor to perform torque reduction control according to the torque reduction control requested from the traction controller, and when the request for the torque reduction control is released, the vehicle controller sets a gradient for torque restoration of the engine and the motor and applies the gradient to follow the demand torque for driving.

The vehicle controller may maintain continuity of the output torques of the engine and motor by applying the gradient to prevent a step of the output torques from occurring.

According to another exemplary embodiment of the present disclosure, a method of controlling torque for a hybrid vehicle includes determining output torques of an engine and a motor to drive the hybrid vehicle in a hybrid electric vehicle (HEV) mode according to demand torque for driving. Output torques of the engine and the motor are controlled when a torque reduction control is requested from a traction controller. A gradient is set for torque restoration of the engine and the motor when release of the torque reduction control is requested from the traction controller. The output torques of the engine and the motor are restored with the gradient and the demand torque is followed for driving.

The method may further includes maintaining continuity of the output torques of the engine and the motor to prevent a step of the output torques from occurring when the output torques of the engine and the motor are restored.

According to an exemplary embodiment of the present disclosure, since it is possible to maintain continuity of torques from an engine and a motor that have different responsive performances when a torque reduction control of the TCS is released, drivability may be improved.

DETAILED DESCRIPTION OF THE EMBODIMENTS

Figure 1:
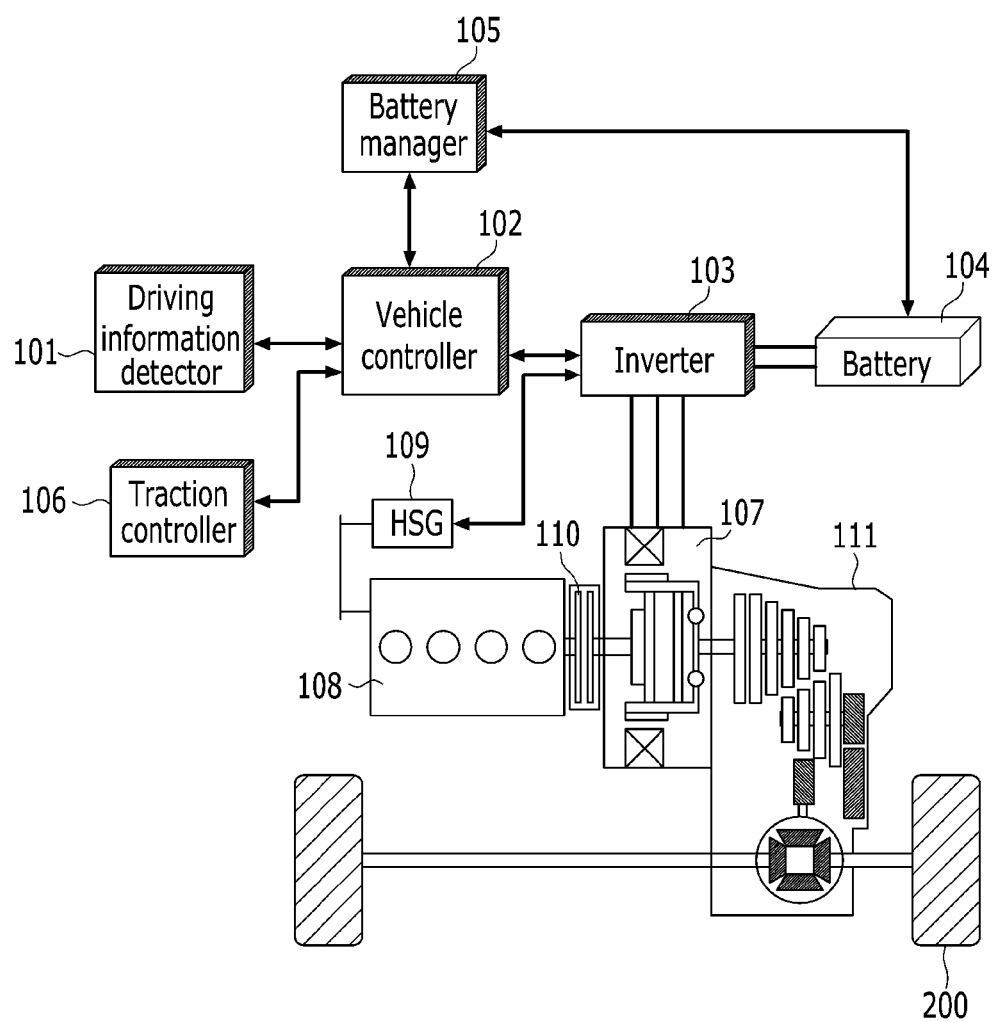
FIG. 1 shows a schematic diagram of a system for controlling torque for a hybrid vehicle according to an exemplary embodiment of the present disclosure.

Hereinafter, the present disclosure will be described more fully with reference to the accompanying drawings, in which exemplary embodiments of the disclosure are shown.

As those skilled in the art would realize, the described embodiments may be modified in various different ways, all without departing from the spirit or scope of the present disclosure. Parts that are irrelevant to the description will be omitted to clearly describe the present disclosure, and the same elements will be designated by the same reference numerals throughout the specification. In addition, each configuration illustrated in the drawings is arbitrarily shown for convenience of description, but the present disclosure is not limited thereto.

FIG. 1 shows a schematic diagram of a system for controlling torque for a hybrid vehicle according to an exemplary embodiment of the present disclosure. Referring to FIG. 1, the system according to an exemplary embodiment of the present disclosure includes a driving information detector 101, a vehicle controller 102, an inverter 103, a battery 104, a battery manager 105, a traction controller 106, a motor 107, an engine 108, a hybrid starter and generator (HSG) 109, an engine clutch 110, a transmission 111, and a wheel 200.

During driving of a hybrid vehicle, the driving information detector 101 provides driving information including a vehicle speed, a shift stage, a displacement of an acceleration pedal, and a displacement of a brake pedal to the vehicle controller 102. The vehicle controller 102 may be referred to as a hybrid controller. The vehicle controller 102 is an uppermost controller, and totally controls various controllers (not shown) connected to a network. The vehicle controller 102 sets output torques of the engine 108 and the motor 107 according to a driving demand torque, a state of charge (SOC) of the battery 104, and so on, and controls total output torque to drive in an hybrid electric vehicle (HEV) mode with optimal efficiency.

When a torque reduction control from the traction controller 106 is requested, the vehicle controller 102 subtracts the requested torque for the torque reduction control from a current output torque in order to set reduction torques of the engine 108 and the motor 107, and controls operation of the engine 108 and the motor 107 to reduce the output torque. In other words, the vehicle controller 102 performs a preset control to prevent a wheel slip for stable driving.

While the vehicle controller 102 controls the reduction control with respect to the output torques of the engine 108 and the motor 107, when the requested torque reduction control from the traction controller 106 is released, the vehicle controller 102 sets a restoration gradient in order to restore torques of the engine 108 and the motor 107 to a driving demand torque. The vehicle controller 102 uses the set restoration gradient to restore the torques of the engine 108 and the motor 107, and follows the driving demand torque while preventing a torque step from occurring. When the output torques of the engine 108 and the motor 107 are restored to the driving demand torque, the vehicle controller 102 performs a normal control of the output torques of the engine 108 and the motor 107 according to the driving demand torque.

The inverter 103 is provided with a plurality of electrical power switches and inverts a direct current (DC) power to a 3-phase alternating current (AC) power according to a control signal transmitted from the vehicle controller 102 in order to operate the motor 107. The plurality of electrical power switches of the inverter 103 may include at least one of an insulated gate bipolar transistor (IGBT), a metal-oxide-semiconductor field-effect transistor (MOSFET), a field-effect transistor (FET), a transistor, and a relay. The inverter 103 includes a protection circuit unit, which monitors a flow of electrical power, and protects the whole system in the hybrid vehicle and keeps passengers safe against a high voltage when an overvoltage or an overcurrent flows into the power source due to various reasons such as a collision and lightning strikes.

The battery 104 is composed of a plurality of unit cells, and stores the high voltage for supplying the voltage to the motor 107. The battery manager 105 manages the SOC by detecting the current, voltage, and temperature of the cells in an operation range and prevents reduction of lifespan due to over-discharge under a critical voltage or overcharge over a critical voltage by controlling a charge/discharge voltage of the battery 104.

When a wheel slip from among driving wheels is detected, the traction controller 106 controls an oil pressure supplied to a brake cylinder through a modulator (not shown), and sends a request for torque reduction control to the vehicle controller 102 connected thereto by a network such that output torques of the engine 108 and the motor 107 may be reduced. The motor 107 is operated by a 3-phase AC voltage applied from the inverter 103 to generate torque, operates as a power generator, and supplies regenerative energy to the battery 104 while coasting.

The engine 108 outputs a first power as a power source when turned on. The HSG 109 operates as a starter or a generator, starts the engine 108 in response to a control signal from the vehicle controller 102, and generates power by operating as the generator and supplies the generated power as a charge voltage to the battery 104 through the inverter 103, while the engine 108 keeps operating.

The engine clutch 110 is disposed between the engine 108 and the motor 107 so that traveling in an electric vehicle (EV) mode and the HEV mode can be provided. The transmission 111 is an automatic transmission or a continuously variable transmission (CVT) and shifts to a desired gear by operating engagement elements and disengagement elements by hydraulic pressure.

Figure 2:
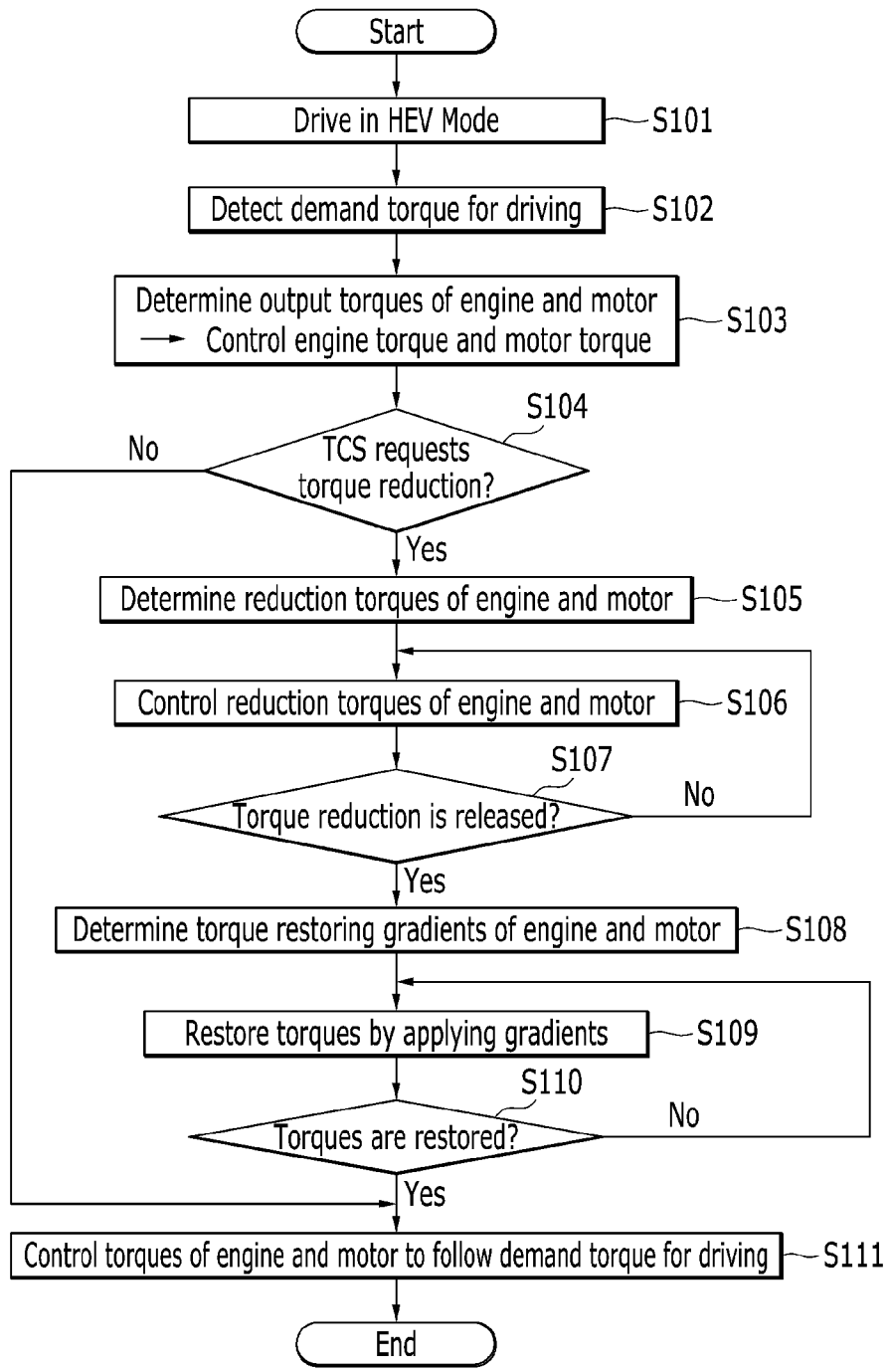
FIG. 2 shows a flowchart of a method of controlling torque for a hybrid vehicle according to an exemplary embodiment of the present disclosure.

The operation of controlling torque for a hybrid vehicle according to the present disclosure having the configuration including the function described above is achieved as follows. FIG. 2 shows a flowchart of a method of controlling torque for a hybrid vehicle according to an exemplary embodiment of the present disclosure.

While the hybrid vehicle to which an exemplary embodiment of the present disclosure is applied travels in a hybrid electric vehicle (HEV) mode at step S101, the vehicle controller 102 sets respective output torque of the engine 108 and the motor 107 according to a driving demand torque supplied from the driving information detector 101 to control the total output torque at steps S102 and S103. While the vehicle controller 102 controls the total output torque based on the respective set output torque of the engine 108 and the motor 107 as described above, the vehicle controller 102 determines whether a torque reduction control is requested from the traction controller 106 at step S104.

When the torque reduction control is requested from the traction controller 106, the vehicle controller 102 subtracts the requested torque for the torque reduction control from a current output torque in order to set respective reduction torque of the engine 108 and the motor 107 at step S105, and applies the respective set reduction torque and performs the torque reduction control based on the applied reduction torque to prevent a wheel slip from occurring for a stable operation at step S106. While the vehicle controller 102 performs the torque reduction control with respect to the respective output torques of the engine 108 and the motor 107, the vehicle controller 102 determines whether a release of the torque reduction control is requested by the traction controller 106 at step S107.

Figure 3:
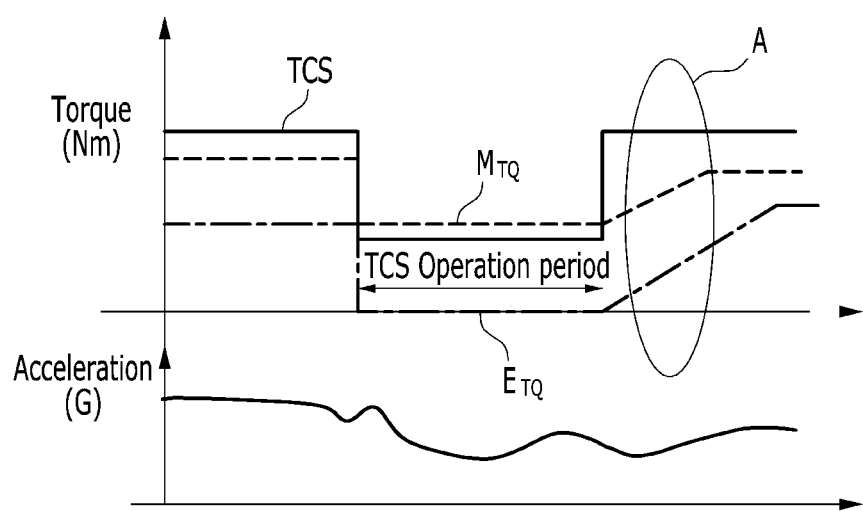
FIG. 3 is a graph for explaining operation of an exemplary embodiment of the present disclosure.

When the release of the torque reduction control is requested by the traction controller 106, the vehicle controller 102 sets a restoration gradient to restore torques of the engine 108 and the motor 107 to a driving demand torque at step S108. The vehicle controller 102 uses the restoration gradient set at step S108, and restores the output torques of the engine 108 and the motor 107 as shown in FIG. 3, following the driving demand torque while preventing a step of the output torques from occurring at step S109. In the state that continuity of the output torques is maintained by applying and using the restoration gradient, when the output torques of the engine 108 and the motor 107 are restored to the driving demand torque at step S110, the vehicle controller 102 normally controls output torques of the engine 108 and the motor 107 according to driving demand torque at step S111.

While this disclosure has been described in connection with what is presently considered to be practical exemplary embodiments, it is to be understood that the disclosure is not limited to the disclosed embodiments, but, on the contrary, is intended to cover various modifications and equivalent

What is claimed is:

1. A system for controlling torque for a hybrid vehicle, comprising:
    a power source that includes an engine and a motor;
    an engine clutch provided between the engine and the motor;
    a driving information detector configured to detect a demand torque for driving;
    a traction controller configured to control an oil pressure supplied into a brake to prevent a wheel slip and configured to request torque reduction control from a vehicle controller when the wheel slip is detected; and
    a vehicle controller configured to control engagement of the engine clutch for driving in a hybrid electric vehicle (HEV) mode,
    wherein the vehicle controller determines torques of the engine and the motor to perform the torque reduction control according to the requested for torque reduction control from the traction controller, and when the request for the torque reduction control is released, the vehicle controller sets a gradient for torque restoration of the engine and motor and applies the gradient to follow the demand torque for driving,
    wherein the vehicle controller maintains continuity of output torques of the engine and the motor by applying the gradient to prevent a step of the output torques from occurring.

2. A method of controlling torque for a hybrid vehicle, comprising steps of:
    determining output torques of an engine and a motor to drive the hybrid vehicle in a hybrid electric vehicle (HEV) mode according to demand torque for driving;
    controlling the output torques of the engine and the motor when torque reduction control is requested from a traction controller;
    setting a gradient for torque restoration of the engine and the motor when a release of the torque reduction control is requested from the traction controller;
    restoring the output torques of the engine and the motor with the gradient and following the demand torque for driving; and
    maintaining the continuity of the output torques of the engine and the motor to prevent a step of the output torques from occurring when the output torques of the engine and the motor are restored.

3. A system for controlling torque for a hybrid electric vehicle (HEV), comprising:
    a power source including an engine and a motor,
    an engine clutch provided between the engine and the motor,
    a traction controller configured to control a wheel slip,
    a vehicle controller configured to control engagement of the engine clutch for driving in an HEV mode,
    wherein the vehicle controller maintains torque continuity between the engine and the motor with different responsive performances when a torque reduction control is released according to a method comprising:
    determining output torques of the engine and the motor to drive the hybrid vehicle in the HEV mode according to demand torque for driving;
    controlling the output torques of the engine and the motor when torque reduction control is requested from a traction controller;
    setting a gradient for torque restoration of the engine and the motor when a release of the torque reduction control is requested from the traction controller;
    restoring the output torques of the engine and the motor with the gradient and following the demand torque for driving; and
    maintaining the continuity of the output torques of the engine and the motor to prevent a step of the output torques from occurring when the output torques of the engine and the motor are restored.

* * * * *